United States Patent
Tartaro et al.

(10) Patent No.: US 11,579,249 B2
(45) Date of Patent: Feb. 14, 2023

(54) RADAR DETECTION SYSTEMS AND METHODS FOR DETECTING PERMANENCE OF SLOW TARGETS

(71) Applicant: Inxpect S.p.A., Brescia (IT)

(72) Inventors: Andrea Tartaro, Brescia (IT); Ugo Bertacchini, Brescia (IT); Lorenzo Nava, Brescia (IT)

(73) Assignee: INXPECT S.p.A., Brescia (IT)

( * ) Notice: Subject to any disclaimer, the term of this patent is extended or adjusted under 35 U.S.C. 154(b) by 139 days.

(21) Appl. No.: 17/109,660

(22) Filed: Dec. 2, 2020

(65) Prior Publication Data

US 2021/0173044 A1    Jun. 10, 2021

(30) Foreign Application Priority Data

Dec. 6, 2019   (IT) .................. 102019000023163

(51) Int. Cl.
*G01S 7/41*       (2006.01)
*G01S 13/04*      (2006.01)
*G01S 13/536*     (2006.01)
*G06V 40/20*      (2022.01)

(52) U.S. Cl.
CPC ............... *G01S 7/415* (2013.01); *G01S 13/04* (2013.01); *G01S 13/536* (2013.01); *G06V 40/20* (2022.01)

(58) Field of Classification Search
CPC .......... G01S 7/415; G01S 7/414; G01S 13/04; G01S 13/536; G01S 13/538; G01S 7/2926; G01S 13/56; G06V 40/20; A61B 5/0205
See application file for complete search history.

(56) References Cited

U.S. PATENT DOCUMENTS

| 2010/0109938 A1* | 5/2010 | Oswald ................. G01S 13/522 |
| | | 707/E17.014 |
| 2013/0106643 A1* | 5/2013 | Wahlquist ............... G01S 13/04 |
| | | 342/27 |

FOREIGN PATENT DOCUMENTS

| DE | 102014222486 A1 | 5/2016 |
| EP | 0547686 A1 | 6/1993 |
| GB | 2453369 A * | 4/2009 ............. G01S 13/04 |

OTHER PUBLICATIONS

International Search Report and Written Opinion in corresponding Italian Application No. 102019000023163 dated Sep. 7, 2020, 9 pages.

* cited by examiner

*Primary Examiner* — Timothy A Brainard
*Assistant Examiner* — Kenneth W Good
(74) *Attorney, Agent, or Firm* — MH2 Technology Law Group LLP

(57) ABSTRACT

A radar detection method may include: transmitting a first radar signal in a field of view and receiving a second radar signal originated from reflections of the first radar signal in the field of view; generating a detection profile by processing the first and second radar signals, the detection profile representing intensities of the second radar signal as a function of positions in the field of view; and analyzing the detection profile to identify targets in the field of view. Analyzing the detection profile may include: using a first mode of analysis, with lower sensitivity, for first cycles, wherein the first mode of analysis is configured to detect a target entering the field of view; using a second mode of analysis, with higher sensitivity, for second cycles following the first cycles, wherein the second mode of analysis is configured to detect stay of the target in the field of view.

15 Claims, 2 Drawing Sheets

RADAR DETECTION SYSTEMS AND METHODS FOR DETECTING PERMANENCE OF SLOW TARGETS

CROSS-REFERENCE TO RELATED APPLICATION(S)

Figure 1:
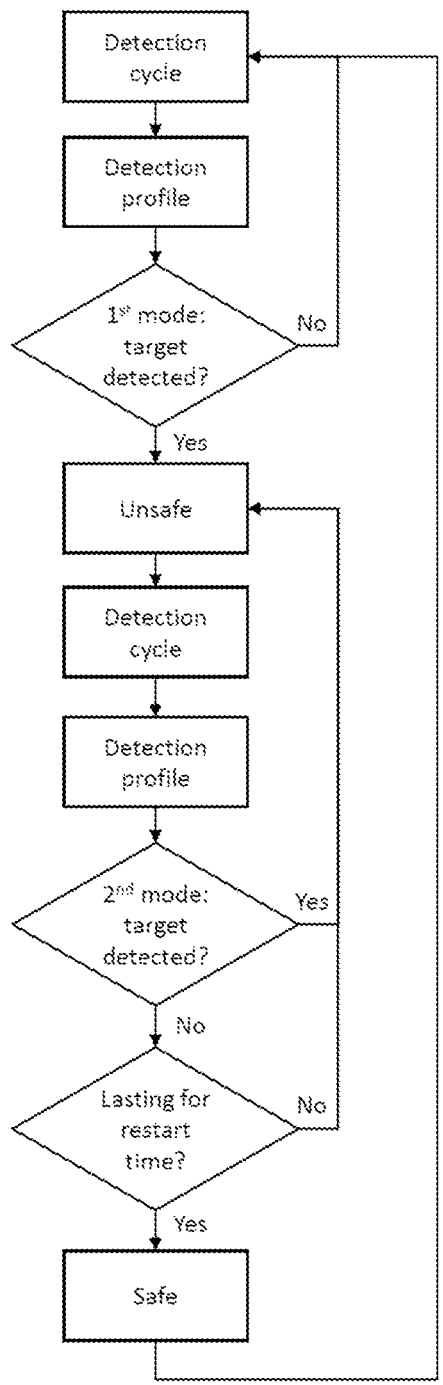

This application claims priority under 35 U.S.C. § 119 from Italian Patent Application No, 102019000023163, filed on Dec. 6, 2019, in the Italian Patent and Trademark Office ("IPTO"), the entire contents of which are incorporated herein by reference.

FIELD OF THE INVENTION

The present ion finds application in the field of radar detection, in particular for safety control in industrial environments. More in detail, the invention relates to a radar detection system and method with controls aimed at checking whether the radar field of view is cleared after the entry of a target.

BACKGROUND ART

Radar detection can detect objects in an environment by transmitting radar signals in a given field of view, and then receiving and analyzing the signal reflected from the objects. One radar application is industrial safety, i.e. monitoring personnel entering a potentially hazardous area, for example due to the operation of a machine, to stop its operation or at least warn of the hazard.

In one exemplary prior art mode of transmission and analysis, known as FMCW (Frequency Modulated Continuous Wave), signal generation occurs with frequency up and/or down ramps. The reflected signal is collected by the same transceiver designed for transmission, which detects a constant frequency difference between the transmitted signal and the received signal, due to the time delay required for the signal to reach the target and return to the transceiver.

Fourier analysis, applied on a mix of the transmitted signal and the received signal, e.g. a product thereof, can accurately identify this frequency difference, by assigning a distance from the transceiver to each harmonic component of the signal, which leads to identify targets based on the positions from which a significant portion of the signal comes.

Since the detection profile obtained with Fourier analysis, which correlates positions and signal amplitudes, contains a stable contribution from the stationary objects in the environment, the targets to be detected are signaled after the signal portion from stationary objects, estimated in a background profile, is removed from the detection profile.

In the most common background profile calculation techniques, the background profile is constantly updated for the radar to learn variations in the stationary scenario and store them in the background. One object introduced into the environment and remaining still for a given time will eventually be neglected as it will be deemed part of the stationary scenario. Updating may be carried out by using a moving average of a given number of previous detection profiles.

EP 0547686 shows an example of analysis of data collected by a radar, based on complex differences from a background (or "clutter") map, for identifying targets in aviation with low radial speeds with respect to the radar.

DE 102014222486 describes a radar control on the presence of living beings in an environment where an inductive recharge for an electric vehicle is conducted. Two detection modes are alternated, one of which, more sensitive, is designed to also detect vital signs such as breathing. To this end, a detection profile is obtained with known techniques, associating to each position in the field of view the corresponding signal intensity. For each relevant peak, intensities of successive cycles are collected. This time shape of the peak intensity is further Fourier transformed for detecting harmonic components between 0.2 and 0.6 Hz, which is the typical breathing rhythm.

PROBLEM OF THE PRIOR ART

In industrial safety applications, updating the background profile may pose a safety risk, since a person entering the monitored area, although initially reported, would be treated as background if it stops and remains still for enough time. As a result, the radar would stop signaling hazardous conditions when the hazardous area has not been evacuated yet, potentially causing dangerous machinery to be reactivated in the presence of people.

While the radar of EP 0547686 is intended to detect movements that would be deemed to be slow in aviation, it does not seem to introduce characteristics that would improve known radars for industrial safety in recognizing people who remain almost stationary after entering the monitored area.

The solution of DE 102014222486 requires, for performing the Fourier transform of the peak amplitudes, that first a certain number of cycles are performed, and only thereafter the target can be determined to be present. However, it would be desirable that the target is detected while the cycles are being performed, without necessarily having to wait that the number of necessary cycles for the Fourier transform is completed.

SUMMARY OF THE INVENTION

The main object of the present invention is to solve the drawbacks noted in the prior art, and in particular to reduce the risk that a radar will cease to signal the presence of a valid target before it has actually left the monitored area.

This and other objects are fulfill d by a radar detection method and a radar detection system as defined in any of the accompanying claims.

The invention provides automatic alternation between two different target recognition modes that are based on the analysis of the detection profiles. The first mode may correspond to one of the known analysis techniques in which the background profile is updated, for example, as noted above. Since such modes are effective in recognizing the entry of a target into the environment, the first mode remains active as long as the environment is free of targets, that is, as long as it does not detect the appearance of a new target.

The second more sensitive mode is then activated when the new target enters the field of view and is aimed at monitoring the permanence of the target in the area. Preferably, the second mode is sensitive to the minor movements that may perform a living target, such as a human, even if it does not move significantly away from its initial position. Thus, the area is not mistaken for clear until such movements are stably finished. Only then will the radar revert to the first mode.

The alternation of the two modes may be also advantageous in comparison to the permanent use of a single slow-movement sensitive mode, which might lead to an excessive number of false alarms in a relatively small environment, like those in which industrial safety must be ensured, even without targets, due to the presence of surrounding semi-stationary objects.

DRAWINGS

Figure 2:
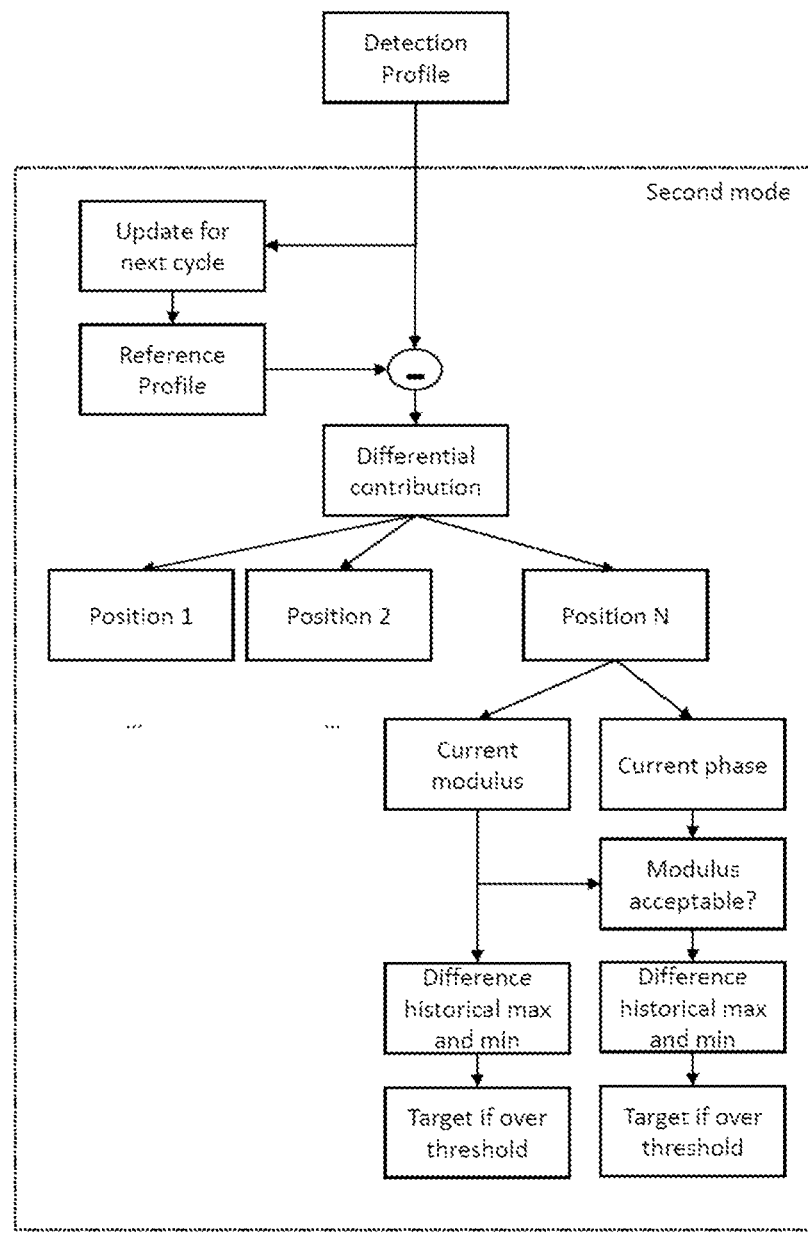

FIG. 1 shows the sequence of steps of a method according to one embodiment of the claimed invention; and FIG. 2 shows the sequence of steps of a second mode of analysis included in the method of FIG. 1.

DETAILED DESCRIPTION

The invention relates to a method and a system for radar detection, especially for industrial safety applications. The steps of the detection method will be now basically described, and most of them may be implemented by the skilled person in a detection system by suitable configuration of electronic components. The electronic components of the system will be only described in broad terms, and even where not expressly stated, the skilled person will easily recognize which component is designed for implementation of the various steps or substeps of the method, or alternatives equivalent to the components as stated.

A first step of the radar detection method is transmitting a first radar signal to a field of view, that is, a region to be monitored in the environment in which the system is installed. For this purpose, the system comprises at least one transceiver having a transmit antenna configured to transmit the first signal into the field of view.

The first radar signal is preferably a microwave signal, e.g. having a frequency ranging from 10 GHZ to 100 GHz. In the applications of greatest interest, the first signal is transmitted at a frequency ranging from 24.0 to 24.25 GHz, or from 57 to 66 GHz, as required by regulations for industrial radars.

The transmission of the first signal, as well as most of the subsequent steps of the method, are cyclically repeated throughout the period in which the presence of targets in the field of view must be monitored. In other words, a plurality of detection cycles must be carried out. It shall be noted that, during each cycle, some of the above described processing steps may involve information concerning a current cycle, that is the latest cycle at the relevant time or in course of operation, but also concerning detection cycles preceding the current cycle.

The first signal propagates in the field of view, is reflected by the targets therein and originates a second radar signal having the same characteristics as the first signal, but generally an attenuated intensity and a time delay. Then, the method includes cyclically receiving the second radar signal, preferably by the same transceiver, and in particular by a receive antenna of the transceiver.

The following step is the known step of cyclically generating a detection profile which represents the intensities that the second signal assumes, as a function of the positions in the field of view from which different components of the second signal come. Thus, these positions correspond to the positions at which the first signal is reflected i.e. the positions of the targets where the second signal assumes a significant intensity, above a noise threshold.

The detection profile is obtained by a processing unit by processing the first and second radar signals. For example, if the first signal is transmitted with the above described RAM technique, the processing step includes mixing the first and second signals, digitizing the mixed signal (possibly after appropriate filtering), applying a Fourier transform and matching the signal frequencies with the positions in the field of view. In the preferred embodiment, the detection profile is obtained and used as a profile having complex numbers. Alternatively, a profile with real numbers may be selected, which numbers may be obtained for example as moduli of complex numbers.

It shall be noted that the above described processing steps originate a detection profile with a discrete position domain. In other words, the detection profile is defined for a discrete set of positions. For example, the radar resolution in terms of position may range from 1 cm to 1 m, preferably from 5 cm to 50 cm. Each target will generally occupy a visibility subset of the discrete set of positions, i.e. those positions of the discrete set of positions wherefrom the target reflects enough signal to be distinguished from noise.

The term position may be understood as a one-dimensional position, such as the distance from the transceiver, or two- or three-dimensional positions, which may comprise azimuth and elevation angles relative to the transceiver, in addition to distance. Such profiles obtained as a function of two- or three-dimensional positions may be provided by a variety of well-known techniques and may require the presence of a plurality of distinct transceivers or particular antenna arrangements in the system. Nevertheless, these techniques are substantially irrelevant to the purposes of the invention and will not be further discussed herein.

The main step of the method consists in cyclically analyzing the detection profile to identify targets in the field of view. This step is carried out by an analysis unit and is divided into several substeps, for which two distinct modes of analysis are provided.

The two modes of analysis are generally used during distinct detection cycles, and in particular there will be a first series of cycles in which a first lower-sensitivity mode of analysis is used, a subsequent second series of cycles in which a second higher-sensitivity mode of analysis is used, and a further subsequent third series of cycles in which the first mode of analysis is used again, the alternation of the two modes being resumed from the beginning.

Now it will be noted that during the second series of cycles, the first mode of analysis may be additionally kept active in parallel to the second mode of analysis. Here, during the second series of cycles, in addition to the targets identified based on at least the second mode, the targets identified on the basis of the first mode alone may be also signaled. Nevertheless, due to the higher sensitivity of the second mode, there are a few chances that a target will be detected with the first mode and not with the second mode.

On the other hand, during the first and third series of cycles, the second mode of analysis is inactive, or at most individual minor steps of the second mode may be carried out without reproducing all the essential steps thereof, and in particular without signaling targets that can be identified based on the second mode and not based on the first mode.

The first lower-sensitivity mode of analysis is suitable to detect a target entering the field of view. More in detail, the first mode of analysis is sensitive to targets that will be referred to as active moving targets, which are indicatively represented by targets that move to a significant extent in the field of view, obviously as long as they remain in the field of view and are large enough to produce a second signal that can be distinguished from the environmental noise. Conversely, the first mode of analysis is insensitive to targets that will be referred to as targets in an animated rest state, represented by targets that, while making small movements, occupy substantially the same region of the field of view for a long time.

In the preferred embodiment, the targets in the animated rest state are represented by the target class assimilated to the background as described in the prior art section. More in detail, for the applications of greater interest, the targets in the animated rest state include human beings and/or animals that during a predetermined stop time do not walk (or run) but make movements related to vital signs, such as breathing and weight balancing between the legs.

The targets in the animated rest state can therefore be defined, for example, as targets that move without changing their own visibility subset for a number of consecutive detection cycles corresponding at least to the stop time.

An alternative definition for the targets in the animated rest state is given by targets which, while moving, have a momentum that is lower than a predetermined momentum threshold at least by the stop time. The momentum is a magnitude that is deemed to be appropriate because it substantially reflects the overall motion of a target, for example the motion of its center of gravity, while assigning a limited weight to the movements of individual portions of the target. Therefore, a small momentum may precisely correspond to the situations indicated above of a target not moving as a whole, but only having some moving parts.

Nevertheless, these definitions are merely illustrative and not necessarily all of them must be fulfilled. Moreover, it will be understood that the first mode of analysis could in any case be sensitive to targets which, while remaining substantially stationary as a whole according to one of the above definitions, have individual parts moving at speeds higher than a maximum speed threshold.

On the other hands, active moving targets preferably comprise at least humans and/or other animals walking (or running or performing other similar overall displacements) within the field of view.

For example, an active moving target ay be intended as each target that, in at least two distinct detection cycles within a time shorter than the predetermined stop time, assumes two respective distinct visibility subsets.

Alternatively, targets whose momentum is higher than the momentum threshold are deemed to be active moving targets.

Finally, for targets that do not fall in either of the two categories, for example having a momentum that is lower than the momentum threshold for a short time, that is, targets whose momentum has fallen below the momentum threshold for a time that is shorter than the predetermined stop time, or targets that maintain their visibility subset constant for a number of cycles that does not reach the predetermined stop time, the detection by the first mode of analysis is uncertain. That is, they will be detected for example as long as their momentum is higher than the momentum threshold and will continue to be detected for a short time following their decrease of momentum, until they are no longer detected within the lapse of the predetermined stop time from the time that the momentum falls below the momentum threshold.

In the detail of the preferred embodiment, the first mode of analysis comprises cyclically generating a background profile, and updating it preferably at each cycle. These operations are carried out for the background profile to represent, as a function of the position in the field of view, the portion of the second radar signal originated from objects with a substantially constant position (and namely a substantially constant visibility subassembly). In particular, the background profile comprises the signal portion originated from the targets in the animated rest state as described above, and therefore causes the insensitivity of the first mode of analysis to the targets in the animated rest state.

That is, the first mode of analysis also includes cyclically generating a residual profile by subtracting the background profile from the detection profile of the current cycle. The targets are then identified from the residual profile, by identifying the positions characterized by peak amplitudes of the residual profile.

Preferred background profile update modes include recursive combinations of a plurality of detection cycles immediately preceding the current cycle (which may or may not be included in the recursive combination itself), for example, given by a moving average or other low-pass digital filters such as FIR (Finite Pulse Response) or IIR (Infinite Pulse Response) filters.

In the preferred embodiment, a digital filter is applied, having a decay time of less than 0.5 seconds, preferably less than 0.2 seconds, from the cease of a constant signal.

In such exemplary filters, as is known, the number of immediately preceding detection cycles for which the detection profiles and/or the previous background profiles are combined remains constant, therefore the set of data involved in the combination is shifted in time at each cycle.

It shall be noted that, equivalently to what has been described above, the generation of the background profile and the residual profile may not be implemented in two separate steps, and a single digital filter may directly calculate the residual profile. Such digital filter would in any case require subtraction of preceding detection profiles, generally weighted with suitable coefficients known to the skilled person, from the current detection profile. The combination of the preceding profiles that are subtracted in this case may be considered as the background profile.

If should be also noted that each of these possible combinations acts independently for all the positions of the field of view. In other words, once a position is selected, the intensity value of the background profile for the selected position is obtained by combining the intensity values assumed by the profiles to be combined at the selected position.

In such updating modes the background only temporarily includes small signal portions connected to the active moving targets, which can thus be discriminated from the background, unlike the targets in the animated rest state, whose signal portion, after a certain number of cycles, at most corresponding to the preset stop time, is substantially entirely included in the background profile.

Moreover, the above described digital filters preferably generate residual profiles in which pulse components of the signal are eliminated, i.e. those occurring for example for a single detection cycle. Limited and periodic movements of the targets in the animated rest state, such as the vital signs that are intended to be recognized, are therefore likely to be neglected.

Preferably, the residual profile from which targets are identified according to the first mode of analysis is a profile with complex numerical values. The subtraction that provides the residual profile thus involves a complex detection profile and a complex background profile.

The first series of cycles end when a target is detected based on the first mode of analysis. This is also the case for the third series of cycles and each subsequent series of cycles based on the first mode of analysis. Therefore, the first mode of analysis is particularly involved as long as the field of view remains clear of foreign moving targets with respect to the stationary objects that are always present. Therefore, no problem arises due to the inclusion of such foreign targets in the background, since as they enter the field of view the second mode of analysis is entered.

The second, higher-sensitivity mode of analysis is suitable to detect the permanence of a target in the field of view. The second series of cycles, in which the second mode of analysis is applied, ends if the second mode of analysis cannot detect any target for a predetermined restart time. This also applies to any subsequent series of cycles based on the second mode of analysis. Once the restart time has elapsed without targets being detected, the first mode of analysis is used again and starts the third series of cycles.

As partially noted above, during the second series of cycles, since a higher sensitivity is required, the first mode of analysis may optionally remain active, or may be deactivated, or only some of its steps may remain active. For example, the background profile may continue to update during the second series of cycles. The fact that the second series of cycles ends only after the restart time has elapsed, without identifying any target according to the second mode of analysis, ensures in any case that upon complete reactivation of the first mode of analysis the background profile contains only stationary objects and not also targets in the animated rest state.

During the second series of cycles, the second mode of analysis is sensitive at least to the targets in the animated rest state as described above. However, the second mode of analysis is preferably also sensitive to active moving targets.

For completely motionless targets, in the preferred embodiment as described below, the second mode of analysis is insensitive to them. In other words, the second mode of analysis is sensitive to the targets in the animated rest state as long as they are actually animated, and do not remain completely motionless for example for a time equal to the stop time. So, inanimate targets are neglected in the second mode, except the case in which they are moved by foreign agents, such as drafts on a plant, while living human and/or animal targets are assumed to always perform at least slight body movements associated to their vital signs, without necessarily moving the entire body to a distinct position in the discrete position domain of the detection profile.

Nevertheless, alternative embodiments may also be envisaged in which the second mode of analysis is also sensitive to completely stationary targets. This can be obtained, for example, by generating and cyclically updating an additional (second) background profile, similar to the above described (first) background profile, the cyclic update being however performed only on condition that the difference between the detection profile of the current cycle and the second background profile stored in the memory, is lower than a predetermined variation threshold. This update is also provided during the first series of cycles. This is followed by cyclically generating a (second) residual profile (with real or complex numbers) which is obtained by subtracting the second background profile from the detection profile of the current cycle, and identifying the targets from the second residual profile.

Turning back to the preferred embodiment, the second mode of analysis comprises generating and cyclically updating a reference profile, preferably with complex numbers. More in detail, the reference profile is calculated, for each position, as an average of the signal intensities of a plurality of detection profiles of the second series of cycles. Of course, to obtain complex numbers, averaging must be also performed on the complex numbers of the detection profiles.

In addition, similar to the background profile, the average is determined independently for all the positions of the field of view. In other words, once a position is selected, the intensity value of the reference profile for the selected position is obtained by averaging the intensity values assumed by the profiles to be combined at the selected position.

It should be noted, however, that, unlike the background profile, the plurality of detection cycles used to update the reference profile is not associated with a fixed number of cycles which shift in time at each cycle. On the other hand, this plurality of detection profiles covers a whole time interval between the generation of the reference profile and a current detection cycle. Such coverage is preferably obtained by including all the detection cycles between the generation of the reference profile and a current detection cycle in the average. Alternatively, for example, the average may include equally spaced detection cycles along this entire time interval, with excluded cycles intervening therebetween.

Therefore, as detection cycles proceed after the generation of the reference profile, the number of cycles that form the basis for the reference profile increases.

Preferably, in any case the reference profile is updated for a maximum number of cycles which corresponds to a time that is shorter than the restart time. In other words, the complex mean is calculated on a set of cycles composed by a number of cycles that progressively increases as the cycles pass, until reaching the maximum number of cycles.

Once the maximum number of cycles has been reached, the reference profile is deleted, regenerated and updated by only averaging signal intensities of detection profiles of cycles that follow the regeneration.

Moreover, if the second mode of analysis leads to the identification of a target, the reference profile will be preferably immediately regenerated, the update being only based on the cycles that follow the regeneration.

In other words, at the beginning of the second series of cycles a reference profile is generated which is recursively updated until a target is recognized, or if no target is detected, up to the maximum number of cycles. Then, a new reference profile is generated, which is also updated using the same criteria. Since the termination of the second series of cycles requires the lapse of at least the restart time, which is longer than the maximum number of cycles, with no target detected, the deletion and generation of the reference profile will be repeated a plurality of times during the second series of cycles.

In the preferred embodiment, the maximum number of cycles corresponds to a time equal to at least 2 seconds, preferably at least 4 seconds. Moreover, the restart time corresponds to a number of cycles that is at least twice the maximum number of cycles, for example equal to at least 4 seconds, preferably at least 8 seconds.

Therefore, second mode of analysis includes cyclically calculating a differential, preferably complex contribution, as the difference between the detection profile of the current cycle and the reference profile. If complex values are used, a modulus of the complex differential contribution and a phase angle of the complex differential contribution can be derived from the differential contribution for each position of the field of view.

Therefore, in the second mode of analysis, the targets are identified from the differential contribution, and in particular from the moduli of the differential contributions and/or from the phase angles of the complex differential contributions.

More in detail, starting from the generation of one of the reference profiles (which may be either the first or one of the following reference profiles), the maximum and minimum values assumed by the moduli and/or by the phase angles of the complex differential contributions following the generation of the reference profile will be stored for each position in the field of view.

Therefore, a target is determined to be present in a specific position if for that position the difference between the maximum and minimum values of the moduli exceeds a maximum modulus threshold, and/or if for that position the difference between the maximum and minimum values of the phase angles exceeds a phase threshold.

If the phase angle is used, only the phase angles associated with complex differential profiles whose modulus exceeds a minimum modulus threshold will be preferably taken, among the phase angle values assumed in different detection cycles. The phase angles of the complex differential contributions with an insufficient modulus will be thus rejected. This is because they would be generated by detection profiles whose complex value is very similar to that of the reference profile, and in this case of high similarity the phase angle of the complex difference results in a substantially random manner from the background noise, and is therefore poorly relevant for identifying targets.

The choice of comparing the current reference with a long-term average clearly increases the sensitivity of the second mode of analysis as compared with the first mode.

A further increase in sensitivity is given by keeping the historical maximum and minimum values of the moduli and/or phase angles of the differential contributions stored until the reference profile is regenerated or until the end of the second series of cycles. That is, the determination of the difference between maximum and minimum does not only account for the deviations of the latest cycle, but also for the events throughout the reference profile updating time that are potentially more significant of the presence of a target.

Therefore, the second mode of analysis is more sensitive than the first mode, especially for pulse and/or periodic movements, which are not forgotten by a filter when the detection cycle in which they occurred has elapsed.

It will be appreciated that periodic deletion and regeneration of the reference profile as described above are useful to avoid the persistence of significant traces of the presence of targets therein. The presence of such traces may prevent a signal reduction, due to the lack of a target, to be recognized as the lack of target. This is because signal reductions are in any case reported in the complex differential contribution.

A skilled person may obviously envisage a number of equivalent changes to the above discussed variants, without departure from the scope defined by the appended claims.

The invention claimed is:

1. A method of radar detection, the method comprising:
cyclically transmitting a first radar signal in a field of view and cyclically receiving a second radar signal originated from reflections of the first radar signal in the field of view;
cyclically generating a detection profile by processing the first and second radar signals, the detection profile representing intensities of the second radar signal as a function of positions in the field of view; and
cyclically analyzing the detection profile to identify targets in the field of view;
wherein cyclically analyzing the detection profile comprises:
using a first mode of analysis, with lower sensitivity, for a first series of cycles, wherein the first mode of analysis is configured to detect a target entering the field of view;
using a second mode of analysis, with higher sensitivity, for a second series of cycles following the first series of cycles, wherein the second mode of analysis is configured to detect stay of the target in the field of view; and
using the first mode of analysis after an end of the second series of cycles;
wherein the first series of cycles ends when the target is detected based on the first mode of analysis, and
wherein the second series of cycles ends if the second mode of analysis cannot detect any target for a predetermined restart time,
wherein the second mode of analysis comprises:
generating and cyclically updating a reference profile with complex numerical values by calculating, for each position, a complex mean of signal intensities of a plurality of detection profiles which cover a time interval between the generating of the reference profile and a current detection cycle;
cyclically calculating a complex differential contribution given by a complex difference between the detection profile of the current detection cycle and the reference profile; and
identifying the targets from the complex differential contribution by, for each position in the field of view:
determining maximum and minimum values of phase angles of the complex differential contributions which follow the generating of the reference profile, limited to the complex differential contributions having a higher modulus than a minimum modulus threshold; and
determining that a target is present if a difference between the maximum and minimum values of the phase angles exceeds a phase threshold.

2. The method of claim 1, wherein the first mode of analysis is insensitive to targets in an animated rest state, having momentum lower than a predetermined momentum threshold for a predetermined stop time, and is sensitive to active moving targets having momentum higher than the predetermined momentum threshold, and
wherein the second mode of analysis is sensitive to the targets in the animated rest state.

3. The method of claim 2, wherein the detection profile is defined for a discrete set of positions, each target occupying a visibility subset of the discrete set of positions, given by the positions of the discrete set of positions, in which the respective target is present, and
wherein the targets in the animated rest state comprise targets that move without changing their visibility subset during the predetermined stop time.

4. The method of claim 2, wherein the targets in the animated rest state include human beings that, during the predetermined stop time, do not walk but make movements related to vital signs.

5. The method of claim 4, wherein the movements related to the vital signs include breathing of the human beings.

6. The method of claim 4, wherein the movements related to the vital signs include weight balancing between legs of the human beings.

7. The method of claim 1, wherein the first mode of analysis comprises:
generating a background profile and cyclically updating the background profile such that the background profile represents, as a function of the position in the field of view, a portion of the second radar signal from objects having a substantially constant position;

cyclically generating a residual profile by subtracting the background profile from the detection profile of the current detection cycle; and identifying the targets from the residual profile.

8. The method of claim 7, wherein while generating and cyclically updating the reference profile, the complex mean is calculated on a cycle set composed by a number of cycles that progressively raises as the cycles pass, until reaching a maximum number of cycles that is smaller than the predetermined restart time, and upon reaching the maximum number of cycles, the reference profile is deleted, regenerated, and updated by averaging only signal intensities of the detection profiles of the cycles which follow the regeneration, wherein the maximum number of cycles corresponds to a time of at least 2 seconds, and wherein updating the background profile comprises applying a digital filter having a decay time of less than 0.5 seconds.

9. The method of claim 7, wherein the residual profile is a profile with complex numerical values.

10. The method of claim 8, wherein the time corresponding to the maximum number of cycles is at least 4 seconds.

11. The method of claim 8, wherein the decay time of the digital filter is less than 0.2 seconds.

12. The method of claim 8, wherein the time corresponding to the maximum number of cycles is at least 4 seconds, and wherein the decay time of the digital filter is less than 0.2 seconds.

13. The method of claim 1, wherein the identifying of the targets in the second mode of analysis comprises, for each position in the field of view:

determining maximum and minimum values of moduli of the complex differential contributions which follow the generating of the reference profile; and determining that the target is present if a difference between the maximum and minimum values of the moduli exceeds a maximum modulus threshold.

14. The method of claim 1, wherein while generating and cyclically updating the reference profile, the complex mean is calculated on a cycle set composed by a number of cycles that progressively raises as the cycles pass, until reaching a maximum number of cycles that is smaller than the predetermined restart time, and upon reaching the maximum number of cycles, the reference profile is deleted, regenerated, and updated by averaging only signal intensities of the detection profiles of the cycles which follow the regeneration.

15. A radar detection system, comprising:

a transceiver configured to cyclically transmit a first radar signal in a field of view and cyclically receive a second radar signal originated from reflections of the first radar signal in the field of view;

a processing unit configured to cyclically generate a detection profile by processing the first and second radar signals, the detection profile representing intensities of the second radar signal as a function of positions in the field of view; and an analysis unit configured to identify targets in the field of view by cyclically analyzing the detection profile;

wherein the analysis unit is configured, when cyclically analyzing the detection profile, to:

use a first mode of analysis, with lower sensitivity, for a first series of cycles, wherein the first mode of analysis is configured to detect a target entering the field of view;

end the first series of cycles when the target is detected based on the first mode of analysis;

use a second mode of analysis, with higher sensitivity, for a second series of cycles, wherein the second mode of analysis is configured to detect stay of the target in the field of view;

end the second series of cycles if the second mode of analysis cannot detect any target for a predetermined restart time; and use the first mode of analysis after the end of the second series of cycles;

wherein the second mode of analysis comprises:

generating and cyclically updating a reference profile with complex numerical values by calculating, for each position, a complex mean of signal intensities of a plurality of detection profiles which cover a time interval between the generating of the reference profile and a current detection cycle;

cyclically calculating a complex differential contribution given by a complex difference between the detection profile of the current detection cycle and the reference profile; and identifying the targets from the complex differential contribution by, for each position in the field of view:

determining maximum and minimum values of phase angles of the complex differential contributions which follow the generating of the reference profile, limited to the complex differential contributions having a higher modulus than a minimum modulus threshold; and determining that a target is present if a difference between the maximum and minimum values of the phase angles exceeds a phase threshold.

* * * * *